United States Patent
Huh

(10) Patent No.: US 10,443,486 B2
(45) Date of Patent: Oct. 15, 2019

(54) VARIABLE FLOW VALVE MECHANISM AND TURBOCHARGER

(71) Applicant: IHI Corporation, Koto-ku (JP)

(72) Inventor: Jaemin Huh, Tokyo (JP)

(73) Assignee: IHI Corporation, Koto-ku (JP)

( * ) Notice: Subject to any disclaimer, the term of this patent is extended or adjusted under 35 U.S.C. 154(b) by 168 days.

(21) Appl. No.: 15/426,652

(22) Filed: Feb. 7, 2017

(65) Prior Publication Data

US 2017/0145909 A1    May 25, 2017

Related U.S. Application Data

(63) Continuation of application No. PCT/JP2015/072773, filed on Aug. 11, 2015.

(30) Foreign Application Priority Data

Aug. 29, 2014  (JP) ................................. 2014-176211

(51) Int. Cl.
    *F02B 37/18*    (2006.01)
(52) U.S. Cl.
    CPC ............. *F02B 37/18* (2013.01); *Y02T 10/144* (2013.01)
(58) Field of Classification Search
    CPC ...... F02B 37/18; F02B 37/183; F02B 37/186; Y02T 10/144
    USPC ......................................................... 60/602
    See application file for complete search history.

(56) References Cited

U.S. PATENT DOCUMENTS

| 4,033,642 A | 7/1977 | Sorgatz et al. |
| 2009/0028694 A1 | 1/2009 | Naemura et al. |
| 2011/0005222 A1* | 1/2011 | Hayashi ................ F02B 37/183 |
| | | 60/602 |

(Continued)

FOREIGN PATENT DOCUMENTS

| CN | 102132047 A | 7/2011 |
| DE | 10 2010 055 382 A1 | 6/2012 |

(Continued)

OTHER PUBLICATIONS

Combined Chinese Office Action and Search Report dated Jun. 21, 2018 in Chinese Patent Application No. 201580042909.6 (with English translation of Category of Cited Documents), 6 pages.

(Continued)

*Primary Examiner* — Thai Ba Trieu
(74) *Attorney, Agent, or Firm* — Oblon, McClelland, Maier & Neustadt, L.L.P.

(57) ABSTRACT

A connecting pin is integrally provided at a distal end portion of an actuating rod of an actuator, a pin hole for allowing insertion of the connecting pin is penetrated and formed at a distal end portion of the link member, an annular wave spring for biasing the connecting pin to a center side of the pin hole is provided inside the pin hole of the link member, the wave spring is fitted into a circumferential groove of the connecting pin and alternately has a plurality of convex portions and a plurality of concave portions along its circumferential direction, each of the convex portions of the wave spring is brought into pressure contact with an inner circumferential surface of the pin hole, and each of the concave portions of the wave spring is brought into pressure contact with a bottom surface of the circumferential groove of the connecting pin.

6 Claims, 8 Drawing Sheets

(56) References Cited

U.S. PATENT DOCUMENTS

| | | | |
|---|---|---|---|
| 2011/0126537 A1 | 6/2011 | Yoshimoto et al. | |
| 2011/0135479 A1 | 6/2011 | Ueda et al. | |
| 2013/0139502 A1* | 6/2013 | Chu | F02B 37/186 60/602 |
| 2013/0333379 A1 | 12/2013 | Hinkelmann et al. | |
| 2014/0140821 A1* | 5/2014 | Pursifull | F02B 37/186 415/145 |
| 2014/0140831 A1 | 5/2014 | Tschirschke | |
| 2014/0366530 A1 | 12/2014 | Murayama et al. | |
| 2017/0122192 A1* | 5/2017 | Uneura | F02B 37/186 |
| 2017/0145911 A1* | 5/2017 | Takahashi | F02B 37/186 |
| 2018/0223727 A1* | 8/2018 | Nakajima | F02B 37/186 |
| 2018/0230847 A1* | 8/2018 | Nakamura | F02B 37/186 |

FOREIGN PATENT DOCUMENTS

| | | |
|---|---|---|
| JP | 61-33923 U | 3/1986 |
| JP | 63-156431 U | 10/1988 |
| JP | 2001-263078 | 9/2001 |
| JP | 2005-315179 A | 11/2005 |
| JP | 2008-101589 | 5/2008 |
| JP | 2009-236088 | 10/2009 |
| JP | 2010-151044 | 7/2010 |
| JP | 2010-209688 | 9/2010 |
| JP | 2011-106358 | 6/2011 |
| JP | 2013-2296 A | 1/2013 |
| JP | 2013-130133 | 7/2013 |
| JP | 2013-185552 | 9/2013 |
| JP | 2014-521865 | 8/2014 |

OTHER PUBLICATIONS

Office Action dated Dec. 5, 2017 in Japanese Patent Application No. 2016-545426, 3 pages.
International Search Report dated Oct. 27, 2015 in PCT/JP2015/072773, filed on Aug. 11, 2015 (with English Translation).
Written Opinion dated Oct. 27, 2015 in PCT/JP2015/072773, filed on Aug. 11, 2015.
Japanese Office Action dated Sep. 25, 2018 in Patent Application No. 2017-245895, 2 pages.

* cited by examiner

VARIABLE FLOW VALVE MECHANISM AND TURBOCHARGER

CROSS REFERENCE TO RELATED APPLICATIONS

This application is a continuation application of International Application No. PCT/JP2015/072773, filed on Aug. 11, 2015, which claims priority to Japanese Patent Application No. 2014-176211, filed on Aug. 29, 2014, the entire contents of which are incorporated by reference herein.

BACKGROUND

1. Technical Field

The present disclosure relates to a variable flow valve mechanism for opening and closing an opening portion of a variable gas flow passage for adjusting a flow rate of an exhaust gas supplied to a turbine wheel side in a turbocharger such as a turbocharger for a vehicle and a turbocharger.

2. Description of the Related Art

As a measure for suppressing an excessive rise of a turbocharging pressure by a turbocharger for a vehicle, a bypass passage is usually formed inside a turbine housing in the turbocharger for a vehicle. A part of an exhaust gas flows through this bypass passage and bypasses the turbine wheel. Furthermore, a waste gate valve for opening and closing an opening portion on an outlet side of the bypass passage is provided at an appropriate position of the turbine housing. Here, the bypass passage is one of a variable gas flow passage for adjusting a flow rate of the exhaust gas supplied to the turbine wheel side, and the waste gate valve is one of a variable flow valve mechanism for opening and closing an opening portion of the variable gas flow passage.

The waste gate valve includes a stem (rotating shaft) rotatably supported by the turbine housing, a valve capable of abutting on and being separated from a valve seat on the opening portion side in the bypass passage, and a mounting member for connecting the stem with the valve. The stem is rotatably supported to a forward direction and to a backward direction in a support hole penetrated and formed in an outer wall of the turbine housing. A base end portion (one end portion) of the stem protrudes outside the turbine housing. Furthermore, a base end portion of the mounting member is integrally connected to a distal end portion of the stem. A valve is provided at a distal end portion of the mounting member. The valve is capable of abutting on and being separated from the valve seat on the opening portion side in the bypass passage. Moreover, a base end portion (one end portion) of a link member is integrally connected to the base end portion of the stem. When the link member swings in the forward direction or in the backward direction around a shaft center of the stem, the valve swings in the forward direction or in the backward direction (in an opening direction or in a closing direction) via the stem and the mounting member.

An actuator is disposed on an outer wall of a compressor housing in the turbocharger for a vehicle. The actuator swings the link member around a shaft center of the stem. In addition, the actuator includes an actuating rod movable in an axial direction thereof (an axial direction of the actuating rod, in other words, an axial direction of the actuator). A distal end portion of the actuating rod is rotatably connected to a distal end portion (the other end portion) of the link member. In order to rotatably connect the distal end portion of the actuating rod and the distal end portion of the link member to each other, a connecting pin is provide at the distal end of the actuating rod, a pin hole for allowing insertion (fitting) of the connecting pin is penetrated and formed at the distal end portion of the link member. When the turbocharging pressure reaches a set pressure, the drive of the actuator makes the actuating rod move to one side of the axial direction thereof (the axial direction of the actuating rod) to thereby swing the link member in the forward direction. When the turbocharging pressure becomes less than the set pressure after the opening portion of the bypass passage is opened, the drive of the actuator makes the actuating rod move to the other side in the axial direction thereof to thereby swing the link member in the backward direction.

Note that a technology relating to the present disclosure is shown in Japanese Patent Application Laid-Open Publication Nos. 2009-236088 and 2008-101589.

SUMMARY

Incidentally, in order to ensure stability of an interlocking operation (behavior) between the actuating rod and the link member, a gap needs to be provided between an inner circumferential surface of the pin hole of the link member and an outer circumferential surface of the connecting pin. On the other hand, in a case of provision of the gap, the connecting pin becomes capable of freely moving with respect to the pin hole of the link member when the opening portion of the bypass passage is opened. Accordingly, when pulsation (pulsation pressure) of an exhaust gas from an engine side or pulsation from an actuator side or the like is generated, the actuating rod and the like vibrate. In such a case, it is concerned that a chattering sound (contact sound by vibration) from the waste gate valve occurs and incurs decrease of quietness of a waste gate valve.

Note that the aforementioned problem is similarly generated also in a variable flow valve mechanism other than the waste gate valve.

Therefore, the present disclosure has an object to provide a variable flow valve mechanism which can solve the aforementioned problem and a turbocharger.

A first aspect of the present disclosure is a variable flow valve mechanism that is used in a turbocharger with a variable gas flow passage inside a turbine housing or a connecting body connected and communicated with the turbine housing, the variable gas flow passage being for adjusting a flow rate of an exhaust gas supplied to a turbine wheel side, the mechanism configured to open and close an opening portion of the variable gas flow passage and including: a stem supported by an outer wall of the turbine housing or the connecting body; a mounting member having a base end portion integrally connected to the stem; a valve provided at a distal end portion of the mounting member and configured to open and close the opening portion of the variable gas flow passage; a link member having a base end portion integrally connected to a base end portion of the stem; an actuating rod having a distal end portion rotatably connected to a distal end portion of the link member and configured to swing the link member around a shaft center of the stem in a forward direction and a backward direction, wherein a connecting pin is provided at the distal end portion of the actuating rod or the distal end portion of the link member, a pin hole for allowing insertion of the connecting pin is penetrated and formed at the distal end portion of the link member or the distal end portion of the actuating rod, and a biasing member configured to bias the connecting pin to a center side of the pin hole of the link member or the actuating rod is provided inside the pin hole.

Here, in the description and claims of the present application, a "turbocharger" has a meaning including not only of a turbocharger with a single stage but also a turbocharger with a multiple stages (low-pressure stage and high-pressure stage). In addition, a "connecting body connected in a state of communicating with the turbine housing," has a meaning including a pipeline, a manifold, a casing and the like which are connected in a state communicating with a gas inlet or a gas outlet of the turbine housing. Furthermore, a "variable gas flow passage" has a meaning including a bypass passage and the like for causing a part of the exhaust gas to bypass the turbine wheel, and a "variable flow valve mechanism" has a meaning including the waste gate valve or the like for opening and closing an opening portion of the bypass passage. Additionally, the term "provided" has a meaning including being indirectly provided via another member and being integrally formed besides being directly provided, and the term "connected" has a meaning including being indirectly connected via another member besides being directly connected. The term "supported" has a meaning including being supported indirectly through another member besides being supported directly. Moreover, a "biasing member" has a meaning including: a spring member such as a torsion spring, an annular wave spring, a leaf spring, or a toothed washer having inner and outer teeth; a rubber member made of heat-resistant rubber; and the like.

A second aspect of the present disclosure is a turbocharger for turbocharging air supplied to an engine by using energy of the exhaust gas from the engine and the turbocharger includes the variable flow valve mechanism according to the first aspect According to the present disclosure, vibration of the actuating rod and the like caused by pulsation or the like of the exhaust gas from the engine side can be suppressed. Therefore, a chattering sound from the variable flow valve mechanism can be reduced, and quietness of the variable flow valve mechanism can be enhanced.

BRIEF DESCRIPTION OF THE DRAWINGS

FIG. 4 also illustrates the link member.

DESCRIPTION OF THE EMBODIMENTS

Figure 1A:
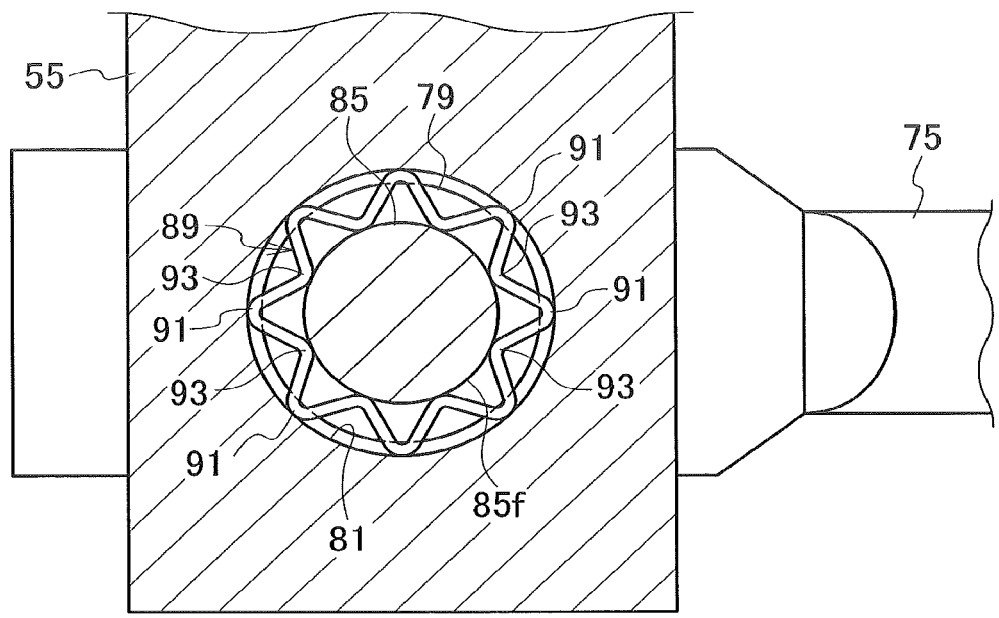
FIG. 1A is a cross-sectional view along IA-IA line in FIG. 1B.

An embodiment of the present disclosure will be described by referring to FIG. 1 to FIG. 8. Note that reference character "L" in the figure denotes a left direction and "R" denotes a right direction.

Figure 2:
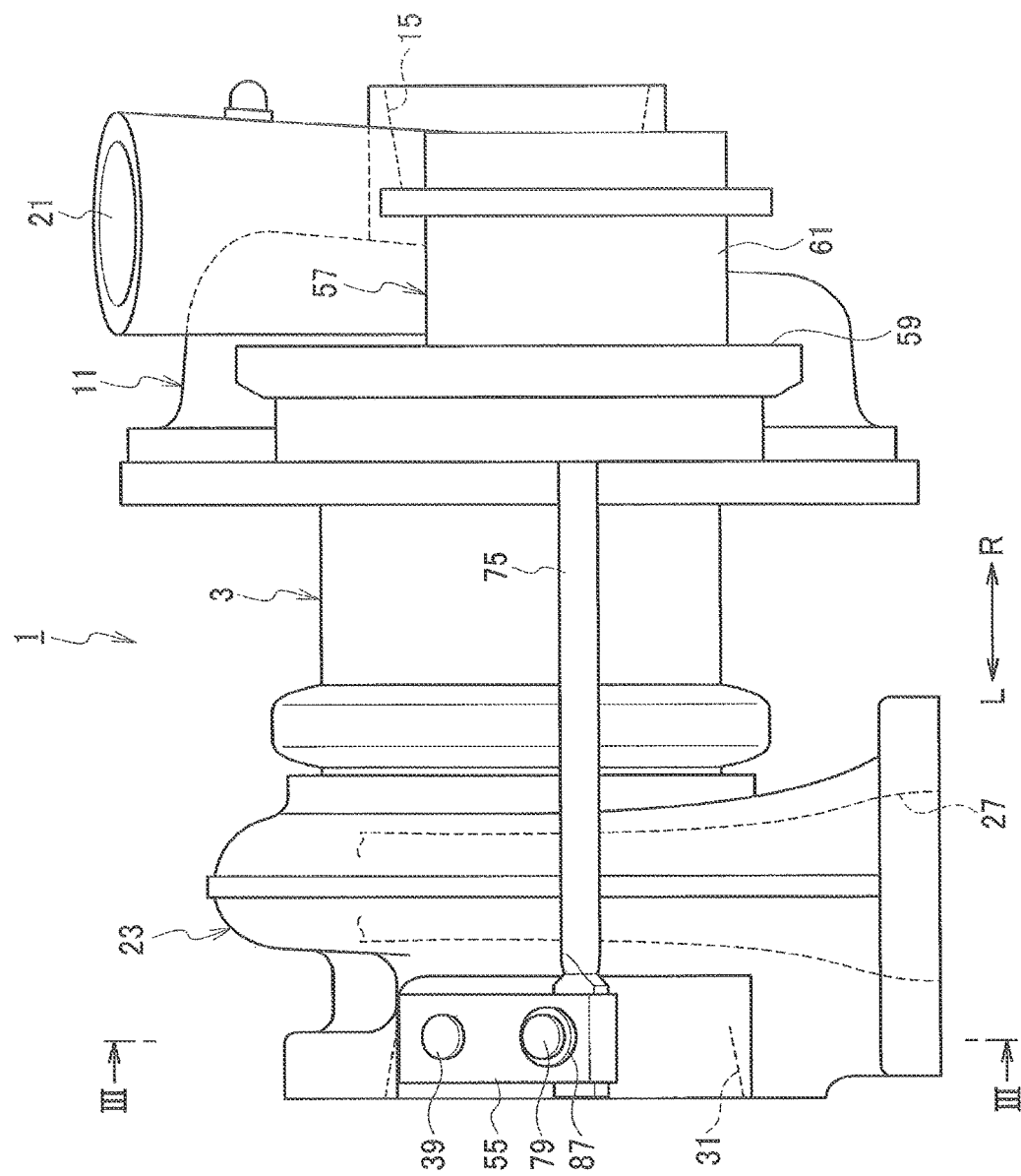
FIG. 2 is a front view of a turbocharger according to an embodiment of the present disclosure.
Figure 8:
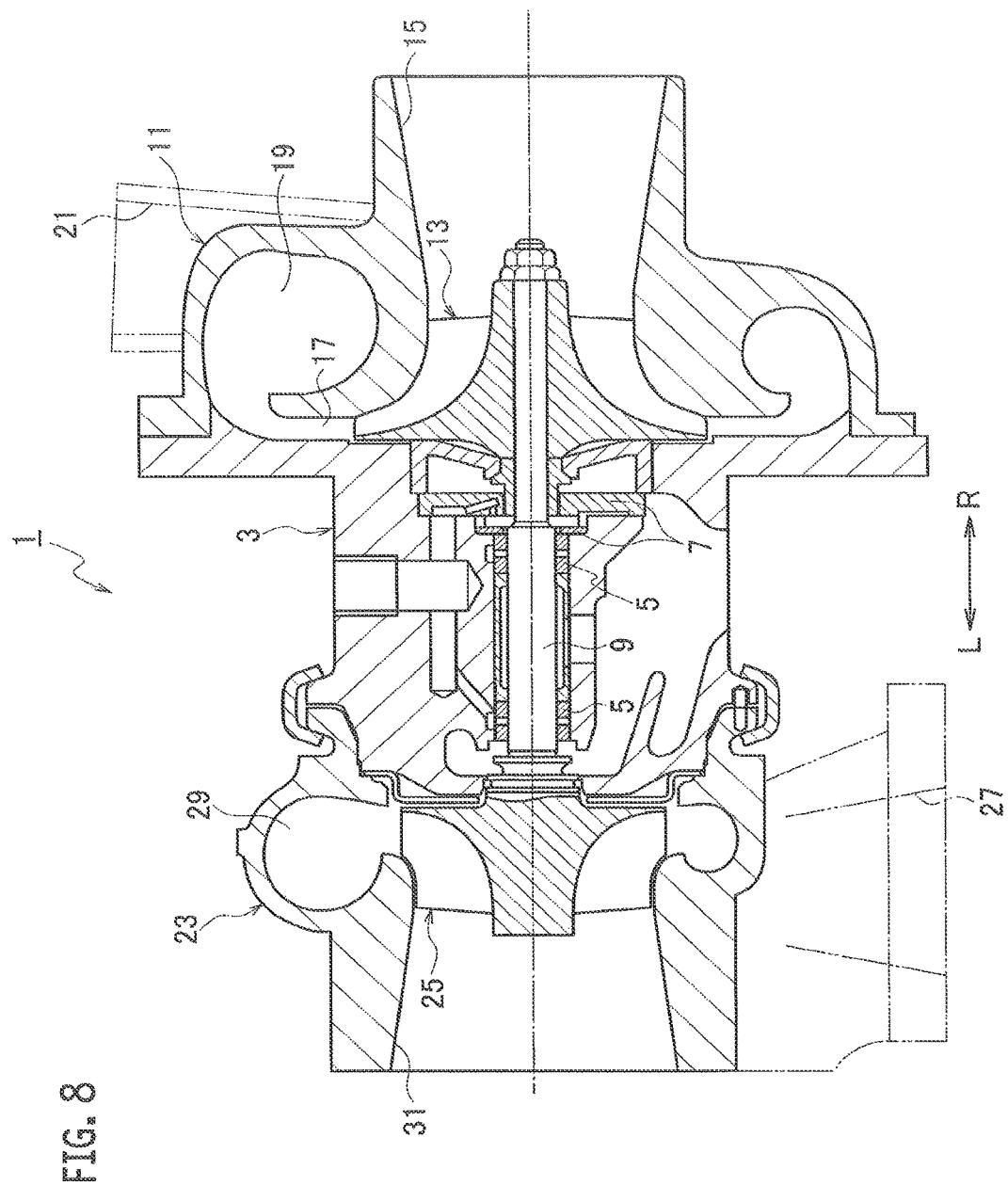
FIG. 8 is a front cross-sectional view of a turbocharger according to an embodiment of the present disclosure.

A turbocharger 1 according to the embodiment of the present disclosure is for a vehicle, for example. As illustrated in FIG. 2 and FIG. 8, the turbocharger 1 turbocharger (compresses) air to be supplied to an engine by utilizing energy of an exhaust gas from an engine (not shown).

As illustrated in FIG. 8, the turbocharger 1 includes a bearing housing 3. A pair of radial bearings 5 and 5 and a pair of thrust bearings 7 and 7 are provided in the bearing housing 3. These bearings rotatably support a rotor shaft (turbine shaft) 9 extending in a right-and-left direction. In other words, the rotor shaft 9 is rotatably provided via the plurality of bearings 5 and 7 in the bearing housing 3.

A compressor housing 11 is provided on the right side of the bearing housing 3. In addition, a compressor wheel 13 is rotatably provided in the compressor housing 11. The compressor wheel 13 is integrally connected concentrically on a right end portion of the rotor shaft 9 and compresses air by utilizing a centrifugal force.

An air inlet (air inlet passage) 15 for introducing air is formed on an inlet side (upstream side in a main stream direction of air) of the compressor wheel 13 in the compressor housing 11. The air inlet 15 is connected to an air cleaner (not shown) for purifying air. Furthermore, a diffuser channel 17 is provided on an outlet side (downstream side in the main stream direction of the air) of the compressor wheel 13 between the bearing housing 3 and the compressor housing 11. The diffuser channel 17 is annularly formed and boosts the pressure of the compressed air. Moreover, a compressor scroll channel 19 is provided in the compressor housing 11. The compressor scroll channel 19 is formed in a spiral state so as to surround the compressor wheel 13 and communicates with the diffuser channel 17. An air outlet (air outlet passage) 21 is formed for discharging the compressed air, at an appropriate position on the outer wall of the compressor housing 11. The air outlet 21 communicates with the compressor scroll channel 19 and is connected to an air feed manifold (not shown) of the engine.

A turbine housing 23 is provided on the left side of the bearing housing 3. In addition, a turbine wheel 25 is rotatably provided in the turbine housing 23. The turbine wheel 25 is integrally connected concentrically on a left end portion of the rotor shaft 9 and generates a rotary force (rotary torque) by using pressure energy of the exhaust gas.

Figure 3:
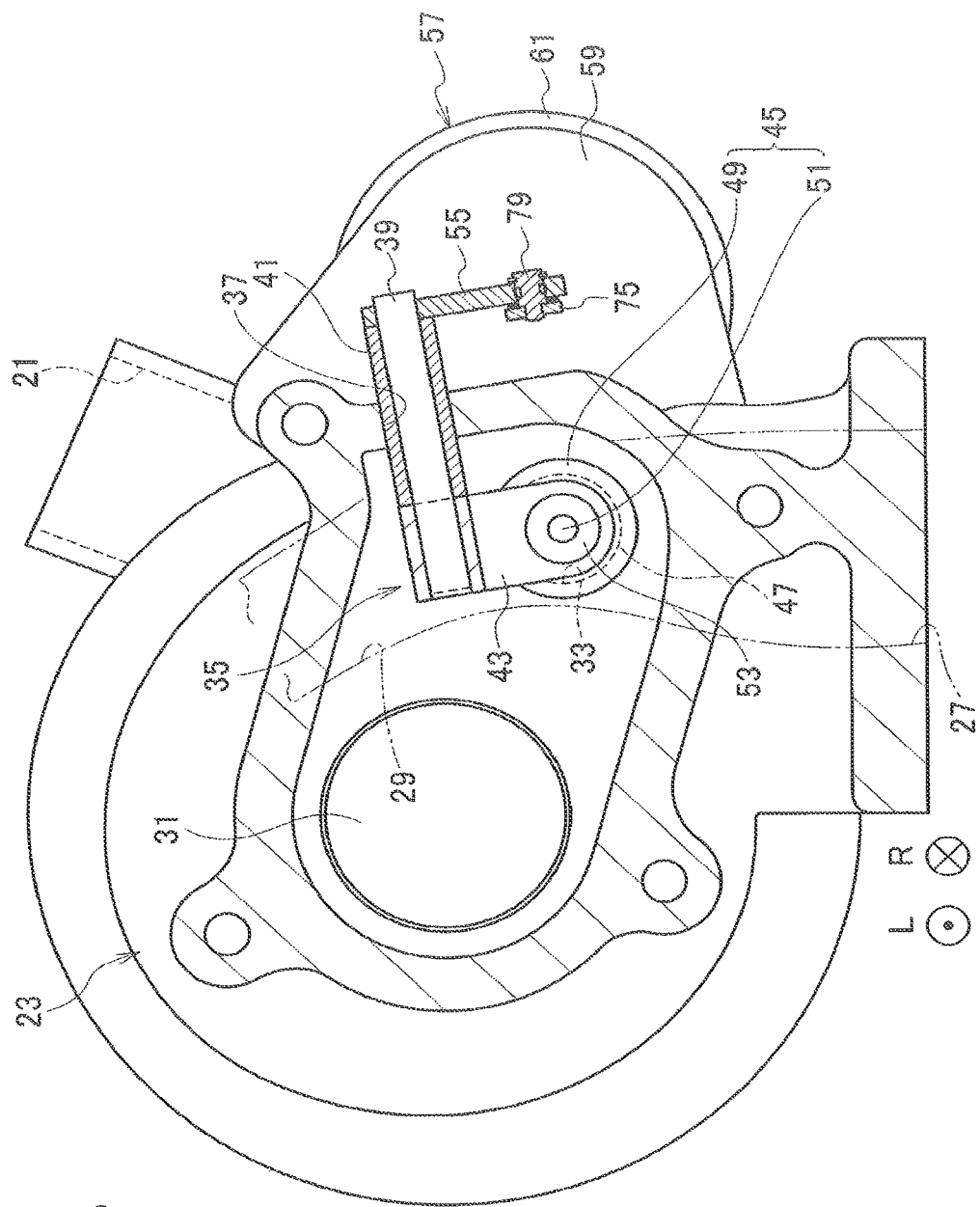
FIG. 3 is a cross-sectional view along line in FIG. 2.

As illustrated in FIG. 2, FIG. 3, and FIG. 8, a gas inlet (gas inlet passage) 27 for introducing the exhaust gas is formed at an appropriate position on the outer wall of the turbine housing 23. The gas inlet 27 is connected to an exhaust manifold (not shown) of the engine. Furthermore, a turbine scroll channel 29 in a spiral state is formed on an inlet side (upstream side in the mainstream direction of the exhaust gas) of the turbine wheel 25 in the turbine housing 23. In addition, a gas outlet (gas outlet passage) 31 for discharging the exhaust gas is formed on an outlet side (downstream side in the main stream direction of the exhaust gas) of the turbine wheel 25 in the turbine housing 23. The gas outlet 31 is connected to a purifying device (not shown) of the exhaust gas using a catalyst via a connection pipe (not shown) or the like.

As illustrated in FIG. 2 and FIG. 3, a bypass passage 33 is formed inside the turbine housing 23. A part of the exhaust gas introduced through the gas inlet 27 flows through the bypass passage 33 and is led out to the gas outlet 31 side. That is, the part of the exhaust gas bypasses the turbine wheel 25 by the bypass passage 33. The bypass passage 33 is a so-called variable gas flow passage for adjusting a flow rate of the exhaust gas supplied to the turbine wheel 25 side and has configuration similar to the known bypass passage disclosed in, for example, Japanese Patent Application Laid-Open Publication No. 2013-185552.

A waste gate valve 35 is provided at an appropriate position of the turbine housing 23. The waste gate valve 35 is constituted so as to open and close an opening portion of the bypass passage 33. That is, the waste gate valve 35 is a so-called variable flow valve mechanism.

The waste gate valve 35 includes a stem (rotating shaft) 39 rotatably supported by the turbine housing 23, a valve 45 for opening and closing the opening portion (valve seat 47) of the bypass passage 33, and a mounting member 43 for connecting the stem 39 with the valve 45. The stem 39 is supported, in a support hole 37 penetrated and formed in an outer wall of the turbine housing 23, rotatably in a forward direction and a backward direction via a bush 41. A base end portion (one end portion, first end portion) of the stem 39 protrudes outside the turbine housing 23. Furthermore, a base end portion of the mounting member (mounting plate) 43 is integrally connected to a distal end portion (the other end portion, second end portion) of the stem 39. A mounting hole (not shown) having a shape with width across flats or a circular shape is penetrated and formed to a distal end portion of the mounting member 43. Note that the base end portion of the mounting member 43 is fixed to the distal end portion of the stem 39 by, for example, fillet welding, TIG welding, laser beam welding, swaging, or the like.

The valve 45 is fitted into the mounting hole of the mounting member 43. In this fitting, the valve 45 is allowed to have play (including tilting and slight movement) with respect to the mounting member 43. Furthermore, the valve 45 includes a valve body 49 capable of abutting on and being separated from the valve seat 47 on the opening portion side of the bypass passage 33, and a valve shaft 51 integrally formed at a center part of the valve body 49 and fitted into the mounting hole of the mounting member 43. As described above, since the play (chattering) of the valve 45 with respect to the mounting member 43 is allowed, adhesiveness of the valve body 49 to the valve seat 47 is assured. Moreover, an annular hook (washer) 53 for preventing removal of the valve 45 from the mounting member 43 is integrally provided at a distal end portion of the valve shaft 51, by fillet welding. Note that the hook 53 is integrally provided at the distal end portion of the valve shaft 51 by, for example, fillet welding, TIG welding, laser beam welding, swaging or the like.

Here, instead of integral formation of the valve shaft 51 at the center part of the valve body 49 and integral provision of the hook 53 at the distal end portion of the valve shaft 51, the valve shaft 51 may be integrally provided at the center part of the valve body 49 and the hook 53 may be integrally formed at the distal end portion of the valve shaft 51. Note that the valve shaft 51 is integrally provided at the center part of the valve body 49 by, for example, swaging, fillet welding, TIG welding or laser beam welding.

The base end portion (one end portion) of the link member (link plate) 55 is integrally connected to the base end portion of the stem 39. Here, the valve 45 swings in the forward direction and the backward direction (opening direction and closing direction) via the stem 39 and the mounting member 43, by causing the link member 55 to swing in forward and backward directions around the shaft center of the stem 39. Note that the base end portion of the link member 55 is integrally connected to the base end portion of the stem 39 by, for example, fillet welding, TIG welding, laser beam welding, swaging or the like.

Figure 4:
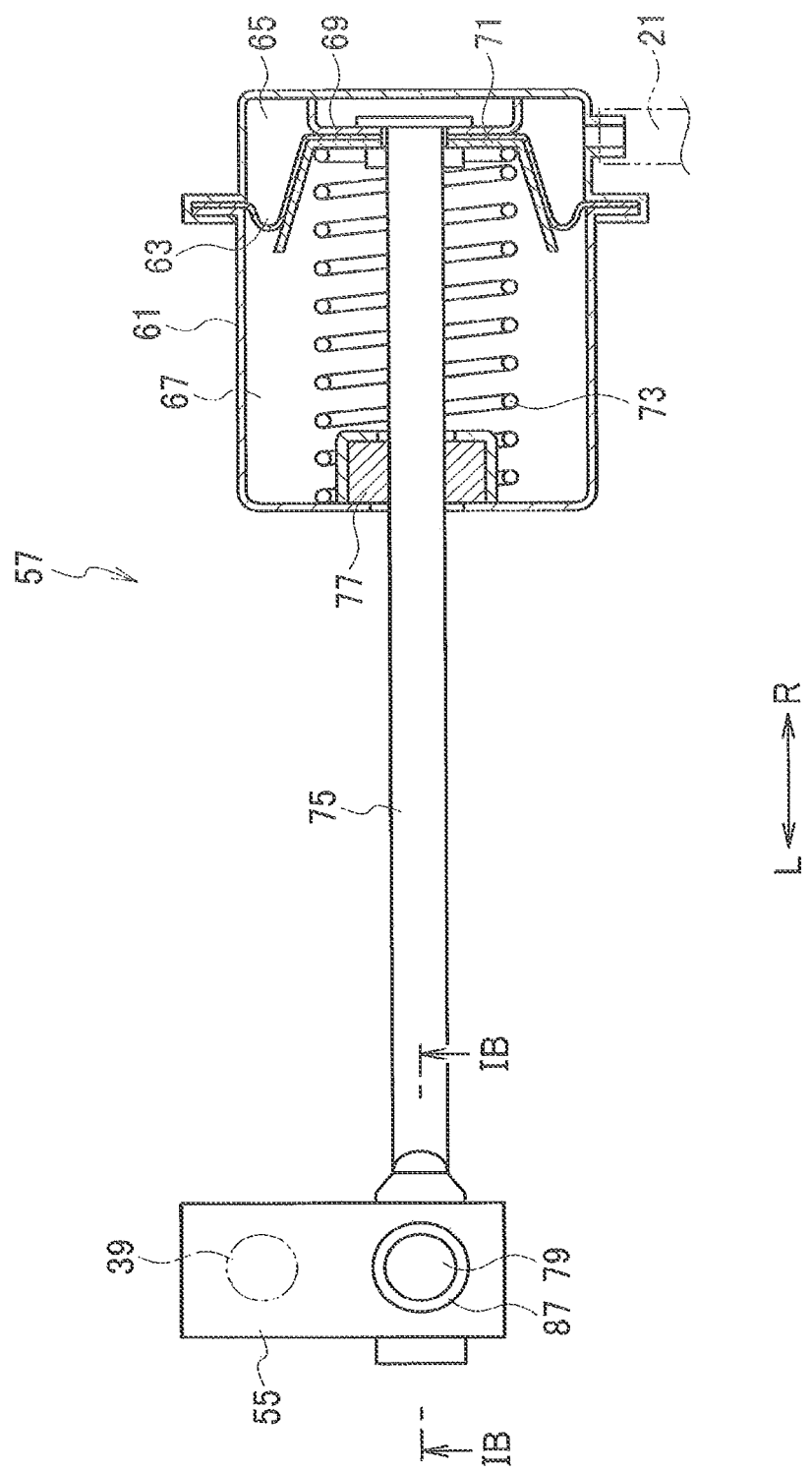
FIG. 4 is a cross-sectional view of a diaphragm actuator.

As illustrated in FIG. 2 to FIG. 4, an actuator 57 is provided on the outer wall of the compressor housing 11 via a bracket 59. The actuator 57 is, for example, a diaphragm actuator as below, and swings the link member 55 around the shaft center of the stem 39 in the forward direction and the backward direction. The actuator 57 includes a cylindrical actuator body 61. Moreover, a diaphragm 63 is provided in the actuator body 61 so as to be divided into a pressure chamber 65 and an atmospheric air chamber 67. The pressure chamber 65 is a chamber (space) to which air at a positive pressure from the air outlet 21 as a pressure source is supplied. The atmospheric air chamber 67 is a chamber communicating with atmospheric air. A first retainer plate 69 is provided on a surface on the pressure chamber 65 side in the diaphragm 63. A second retainer plate 71 is provided on a surface on the atmospheric air chamber 67 side in the diaphragm 63. Furthermore, a return spring (coil spring) 73 is provided in the atmospheric air chamber 67. The return spring 73 biases the diaphragm 63 to the pressure chamber 65 side.

In the actuator body 61, an actuating rod 75 is provided via a bush 77. The actuating rod 75 protrudes outside from the actuator body 61 and is movable in its axial direction (axial direction of the actuating rod 75). Moreover, a base end portion of the actuating rod 75 is integrally connected to a center part of the diaphragm 63. A distal end portion of the actuating rod 75 has a flat plate shape and is rotatably (swingably) connected to a distal end portion of the link member 55.

Figure 1B:
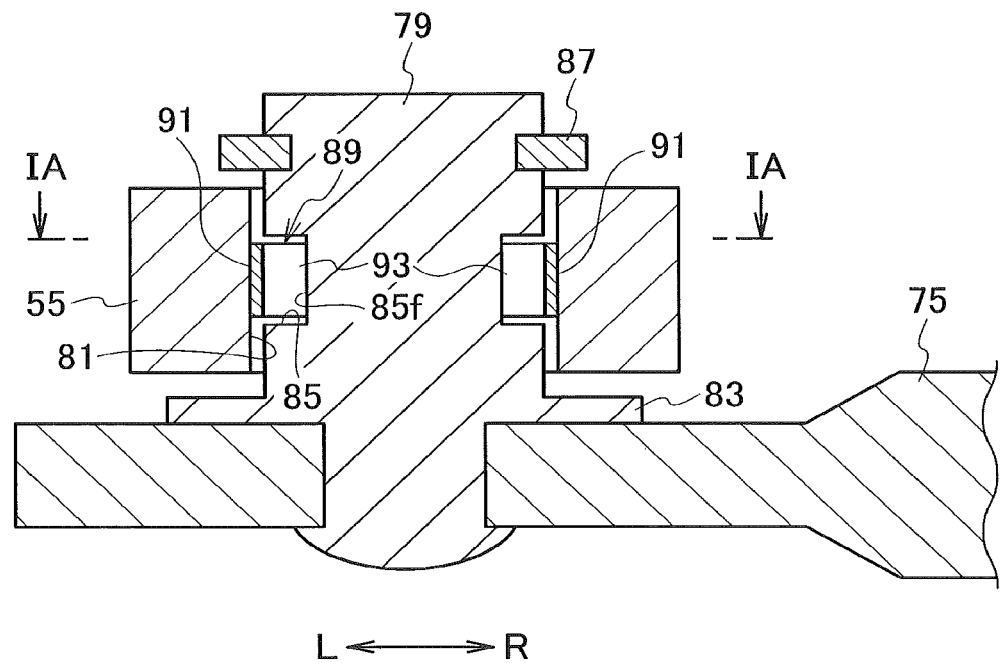
FIG. 1B is an enlarged cross-sectional view along IB-IB line in FIG. 4, and FIG. 1A and FIG. 1B are cross-sectional views, each illustrating a state where an annular wave spring is provided inside a pin hole of a link member.

As illustrated in FIG. 1A, FIG. 1B, and FIG. 4, in order to rotatably connect the distal end portion of the actuating rod 75 and the distal end portion of the link member 55 to each other, a connecting pin 79 (a base end portion of the connecting pin 79) having a circular cross-section is integrally provided (integrally connected) at the distal end portion of the actuating rod 75. In addition, a circular pin hole 81 for allowing insertion (fitting) of the connecting pin 79 is penetrated and formed at the distal end portion of the link member 55. The connecting pin 79 has a flange portion 83 capable of supporting the distal end portion of the link member 55 on the base end portion side. A circumferential groove 85 is formed in an intermediate portion (a portion between the base end portion and the distal end portion) of the connecting pin 79. Furthermore, the distal end portion of the connecting pin 79 is provided with a retainer ring 87 for preventing removal of the link member 55 from the actuating rod 75. Note that the connecting pin 79 is integrally provided at the distal end portion of the actuating rod 75 by, for example, swaging, fillet welding, TIG welding or laser beam welding. A cross-sectional shape of the connecting pin 79 and a shape of the pin hole 81 in this embodiment are circular. However, these shapes may be changed to an arbitrary shape such as a square as long as the connecting pin 79 is relatively rotatable with respect to the pin hole 81. For example, a combination of the cross-sectional shape of the connecting pin 79 and the shape of the pin hole 81 may be changed as appropriate such that the cross-sectional shape of the connecting pin 79 is circular and the shape of the pin hole 81 is a square or the like.

As illustrated in FIG. 1A and FIG. 1B, a wave spring 89 as a biasing member configured to bias the connecting pin 79 to a center side of the pin hole 81 is provided inside the pin hole 81 of the link member 55. The wave spring 89 is annularly formed and biases the connecting pin 79 to the center side of the pin hole 81. The wave spring 89 is made of heat-resistant metal such as a Ni-based alloy, Ni—Co alloy, or stainless steel, and is fitted to the circumferential groove 85 of the connecting pin 79. Furthermore, the wave spring 89 has a plurality of convex portions (mountain portions, convex surface portions) 91 protruding outward in a radial direction of the connecting pin 79 (pin hole 81 of the link member 55) and a plurality of concave portions (valley portions, concave surface portions) 93 dented inward in the radial direction of the connecting pin 79. The convex portions 91 and the concave portions 93 are alternately aligned along a circumferential direction of the wave spring 89. Moreover, each of the convex portions 91 of the wave spring 89 is brought into pressure contact, by an elastic force (biasing force) of the wave spring 89, with an inner circumferential surface of the pin hole 81 of the link member 55. Note that the term pressure contact means making contact while being pressed. The each of the concave portions 93 of the wave spring 89 is brought into pressure contact, by the elastic force of the wave spring 89, with a bottom surface 85*f* (outer circumferential surface of the connecting pin 79) of the circumferential groove 85 of the connecting pin 79. The number of the wave springs 89 is not limited to one but may be two or more. The numbers of the convex portions 91 and the concave portions 93 of the wave spring 89 can also be appropriately changed. In the wave spring 89, a plurality of cuts (not shown) or the like may be formed at intervals along a circumferential direction (circumferential direction of the wave spring 89) within a scope in which the effect of the present disclosure can be exerted.

Furthermore, a configuration of the biasing member configured to bias the connecting pin 79 to the center side of the pin hole 81 or the like can be changed as follows.

Figure 5A:
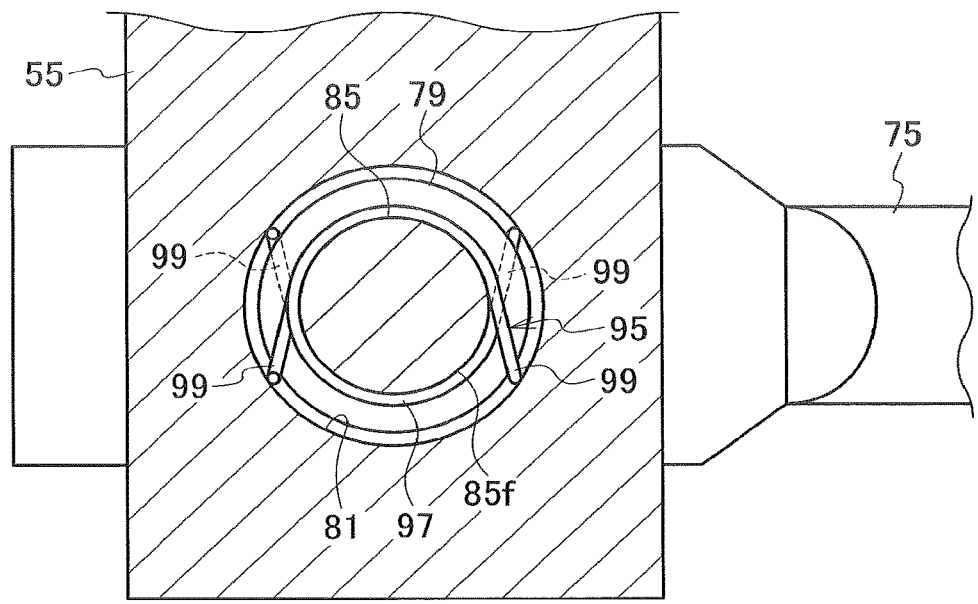
FIG. 5A is a cross-sectional view along VA-VA line in FIG. 5B.
Figure 5B:
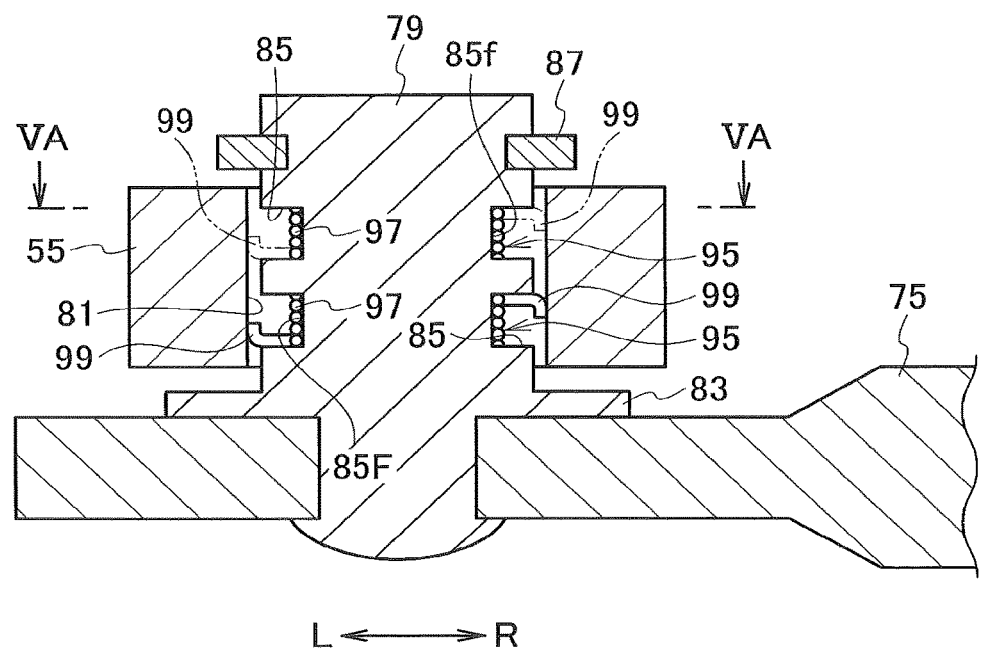
FIG. 5B is a cross-sectional view illustrating a state where two torsion springs are provided inside the pin hole of the link member.

As illustrated in FIG. 5A and FIG. 5B, at least two torsion springs 95 may be used as the aforementioned biasing member. The torsion spring 95 is made of heat-resistant metal such as Ni-based alloy, Ni—Co alloy, or stainless steel. When the torsion spring 95 is used, the circumferential groove 85 for accommodating the torsion spring 95 is formed on a side surface of the connecting pin 79. Here, each of the torsion springs 95 includes a coil portion 97 provided by being fitted so as to surround the circumferential groove 85 of the connecting pin 79 and a pair of arm portions 99 integrally formed by protruding, respectively, on both ends of the coil portion 97. Furthermore, a distal end side of each of the arm portions 99 of each of the torsion springs 95 is bent and molded and is brought into pressure contact with the inner circumferential surface of the pin hole 81 of the link member 55, by the elastic force (biasing force) of each of the torsion springs 95. Moreover, the arm portion 99 of one of the torsion springs 95 and the arm portion 99 of the other torsion spring 95 protrude to directions opposite to each other. Note that the number of the torsion springs 95 is not limited to two but may be one or three or more. The number of the circumferential grooves 85 of the connecting pin 79 may be equal to or different from the number of the torsion springs 95. For example, a configuration may be such that one circumferential groove 85 is provided in the connecting pin 79, and the coil portions 97 of two torsion springs 95 are fitted into this one circumferential groove 85.

Figure 6A:
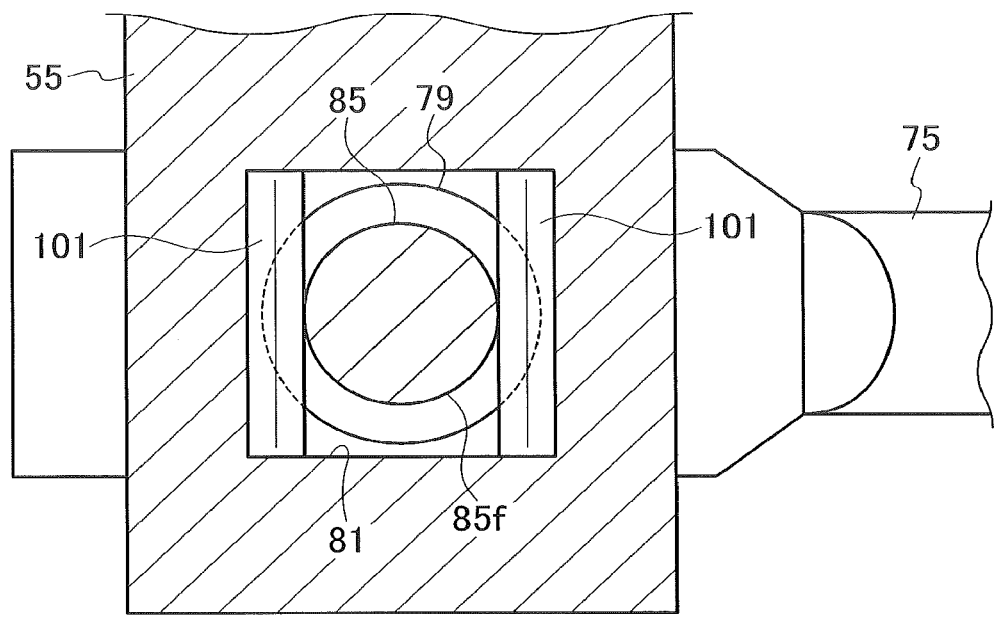
FIG. 6A is a cross-sectional view along VIA-VIA line in FIG. 6B.
Figure 6B:
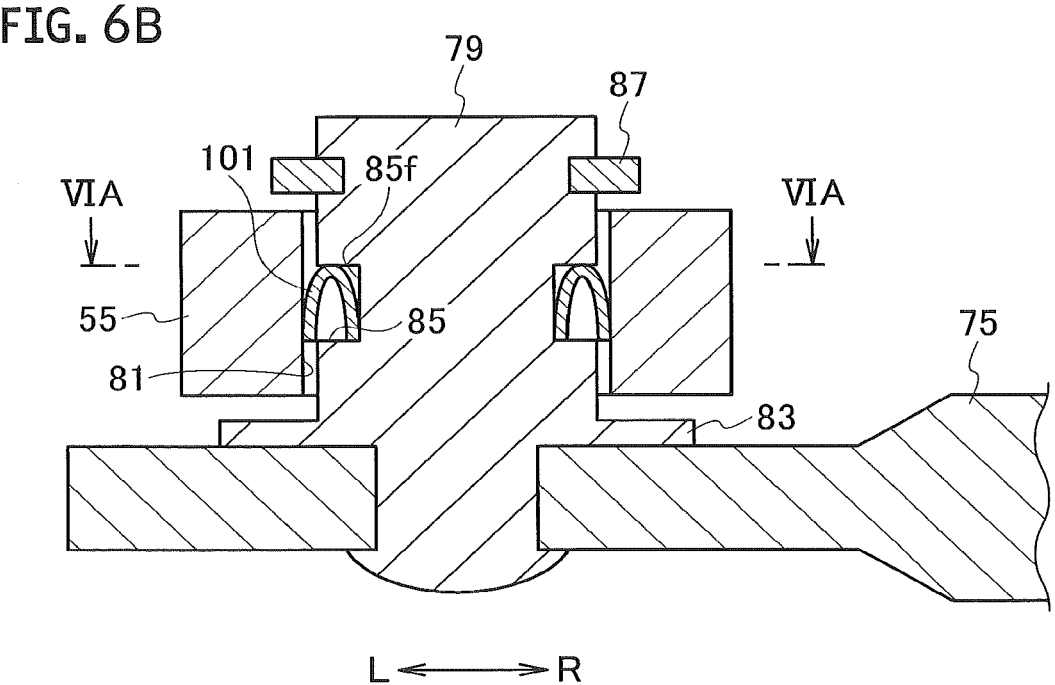
FIG. 6B is a cross-sectional view illustrating a state where two leaf springs are provided inside the pin hole of the link member.

As illustrated in FIG. 6A and FIG. 6B, a leaf spring 101 may be used as the aforementioned biasing member. The leaf spring 101 is made of heat-resistant metal such as Ni-based alloy, Ni—Co alloy, or stainless steel, and has a structure of biasing the connecting pin 79 to the center side of the pin hole 81 of the link member 55 by sandwiching the connecting pin 79. In an example illustrated in FIG. 6A and FIG. 6B, two leaf springs 101 are used. The shape of the pin hole 81 of the link member 55 is a rectangular shape (square shape). Here, a cross-section of each of the leaf springs 101 has a U-shape, and a part of each of the leaf springs 101 is fitted into the circumferential groove 85 of the connecting pin 79. Moreover, each of the leaf springs 101 is brought into pressure contact, by its elastic force (biasing force), with the inner circumferential surface of the pin hole 81 of the link member 55 and the bottom surface 85*f* (outer circumferential surface of the connecting pin 79) of the circumferential groove 85 of the connecting pin 79. Note that the number of the leaf springs 101 is not limited to two but may be three or more as long as the plurality of leaf springs 101 biases the connecting pin 79 to the center side of the pin hole 81 of the link member 55. In addition, the shape of the pin hole 81 of the link member 55 may be a polygonal shape other than the rectangular shape.

Figure 7A:
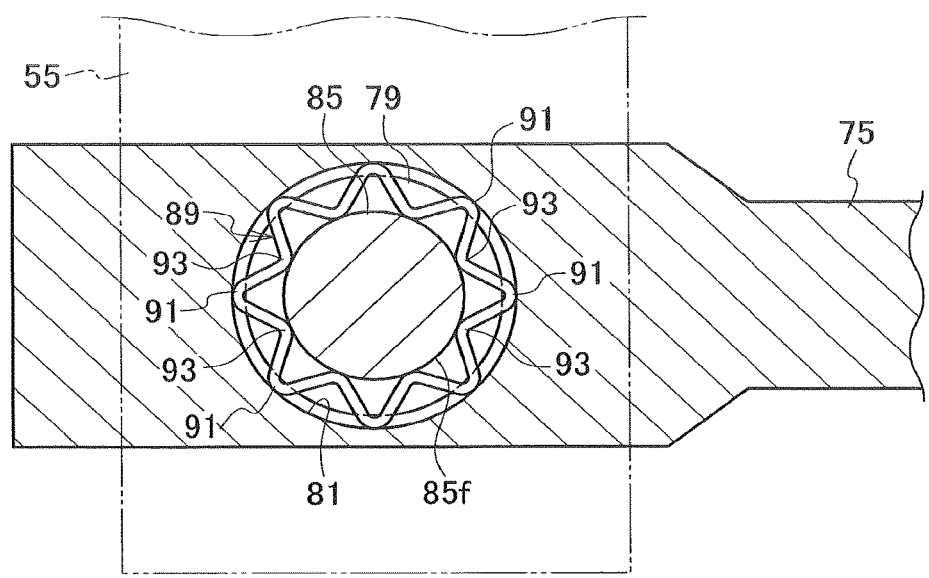
FIG. 7A is a cross-sectional view along VIIA-VIIA line in FIG. 7B.
Figure 7B:
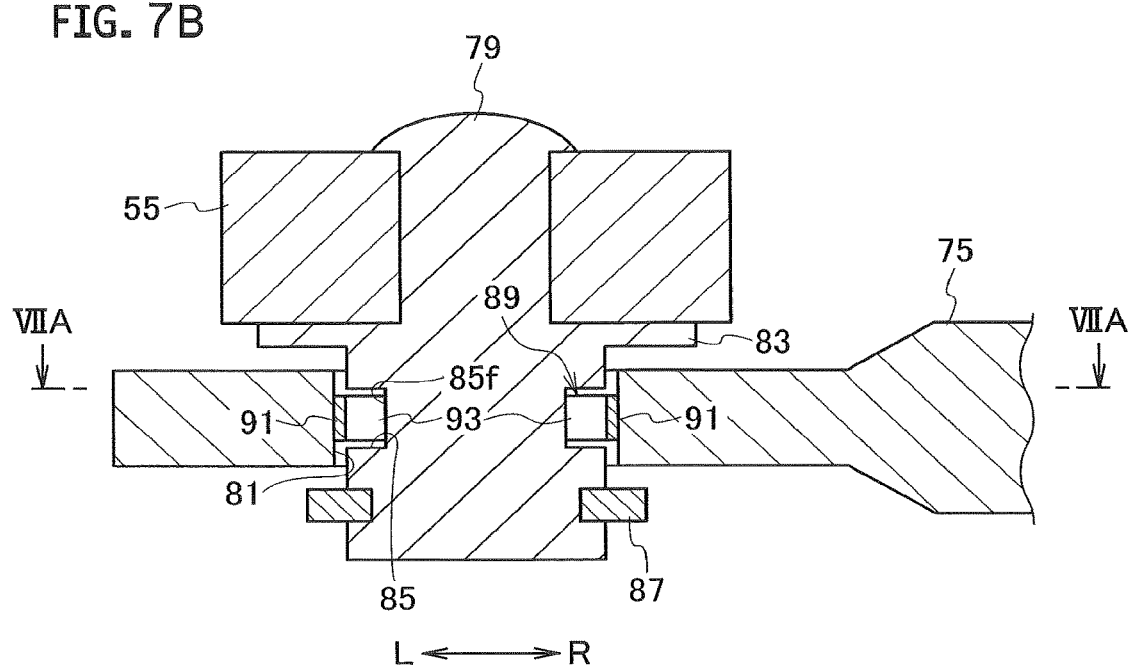
FIG. 7B is a cross-sectional view illustrating a state where the annular wave spring is provided inside the pin hole of the actuating rod.

As illustrated in FIG. 7A and FIG. 7B, a configuration may be such that the connecting pin 79 is integrally provided at the distal end portion of the link member 55, and the pin hole 81 is penetrated and formed at the distal end portion of the actuating rod 75. In this case, the flange portion 83 of the connecting pin 79 is capable of supporting the distal end portion of the actuating rod 75. Note that, FIG. 7A and FIG. 7B illustrate a state where the annular wave spring 89 is provided inside the pin hole 81 of the actuating rod 75, as an example of the biasing member.

Subsequently, the action and the effect of the embodiment of the present disclosure will be described.

When the exhaust gas introduced through the gas inlet 27 flows from the inlet side to the outlet side of the turbine wheel 25 through the turbine scroll channel 29, a rotary force (rotary torque) is generated by using pressure energy of the exhaust gas, whereby the rotor shaft 9 and the compressor wheel 13 can be rotated integrally with the turbine wheel 25. Accordingly, the air introduced through the air inlet 15 can be compressed and discharged from the air outlet 21 through the diffuser channel 17 and the compressor scroll channel 19, and the air to be supplied to the engine can be turbocharged.

During the operation of the turbocharger 1, when a turbocharging pressure (pressure of the air outlet 21) reaches the set pressure, and a positive pressure is applied from the air outlet 21 as a pressure source to the pressure chamber 65, the actuating rod 75 moves to one side (left direction) in the axial direction (axial direction of the actuating rod 75) to thereby swing the link member 55 in the positive direction (clockwise direction in FIG. 1 and FIG. 3). Then, the valve 45 swings to the positive direction (opening direction) via the stem 39 and the mounting member 43 and can open the opening portion of the bypass passage 33. As a result, a part of the exhaust gas introduced through the gas inlet 27 can be made to bypass the turbine wheel 25 to thereby be able to reduce the flow rate of the exhaust gas supplied to the turbine wheel 25 side.

Furthermore, after the opening portion of the bypass passage 33 is opened, when the turbocharging pressure falls to less than the set pressure and the positive-pressure applied state from the air outlet 21 is released, the actuating rod 75 moves to the other side (right direction) in its axial direction by the biasing force of the return spring 73 to thereby swing the link member 55 in the opposite direction (counterclockwise direction in FIG. 1 and FIG. 3). Then, the valve 45 swings to the opposite direction (closing direction) via the stem 39 and the mounting member 43, whereby the opening portion of the bypass passage 33 can be closed. Therefore, the flow of the exhaust gas in the bypass passage 33 can be shut off, and the flow rate of the exhaust gas supplied to the turbine wheel 25 side can be increased.

Since the connecting pin 79 is biased to the center side of the pin hole 81 of the link member 55 or the actuating rod 75 by the spring member such as the annular wave spring 89, even when the pulsation (pulsation pressure) of the exhaust gas from the engine side or the pulsation from the diaphragm actuator 57 side or the like is generated, the vibration of the actuating rod 75 and the link member 55 caused by the pulsation or the like, in particular, the vibration in the axial direction of the actuating rod 75 can be suppressed. Furthermore, the vibration of the actuating rod 75 or the like caused by the pulsation or the like of the exhaust gas from the engine side is suppressed, with the result that the vibration of the valve 45 and the valve seat 47 or the mounting member 43 caused by the pulsation or the like can also be suppressed. Particularly, in a case where the wave spring 89 is used as the spring member, the connecting pin 79 can be stably biased to the center side of the pin hole 81 along its circumferential direction (circumferential direction of the connecting pin 79), whereby the suppression effect of the vibration of the actuating rod 75 or the like can be enhanced.

Since at least apart of the wave spring 89, the torsion spring 95 or the leaf spring 101 is fitted into the circumferential groove 85 of the connecting pin 79, the spring member such as the wave spring 89 can be easily assembled without changing a minimum gap between the outer circumferential surface of the connecting pin 79 and the inner circumferential surface of the pin hole 81, and removal of the spring member such as the wave spring 89 from the inside of the pin hole 81 can be prevented.

Therefore, according to the embodiment of the present disclosure, since the vibration of the actuating rod 75 and the like caused by the pulsation of the exhaust gas from the engine side or the like can be suppressed, the chattering sound from the waste gate valve 35 can be reduced, and quietness of the waste gate valve 35, in other words, quietness of the turbocharger 1 can be enhanced.

Furthermore, since removal of the spring member such as the wave spring 89 from the inside of the pin hole 81 of the link member or the actuating rod 75 can be prevented while mounting performances of the spring member such as the wave spring 89 are enhanced, quietness of the waste gate valve 35 can be stably enhanced assembling performances of the waste gate valve 35 can be improved while assembling performances of the waste gate valve 35 are enhanced.

Moreover, since the vibration of the actuating rod 75 or the like caused by the pulsation or the like of the exhaust gas from the engine side can be suppressed, wear of the outer circumferential surface of the connecting pin 79 and wear of the inner circumferential surface of the pin hole 81 of the link member 55 or the actuating rod 75 can be reduced in addition to the aforementioned effects.

Note that the present disclosure is not limited to the aforementioned explanation of the embodiment but can be carried out in various modes as follows.

A waste gate valve (not shown) opening and closing the opening portion of a bypass passage (not shown) formed in the exhaust manifold may be provided at an appropriate position of the exhaust manifold (not shown) connected in a state of communicating with the gas inlet 27 of the turbine housing 23, instead of provision of the waste gate valve 35 opening and closing the bypass passage 33 at an appropriate position of the turbine housing 23.

A negative pressure may be applied from another pressure source (not shown) on the engine side to the pressure chamber 65, instead of application of the positive pressure from the air outlet 21 to the pressure chamber 65. In this case, the return spring 73 is provided in the pressure chamber 65. Furthermore, the actuator body 61 may have another pressure chamber (not shown), on the inside, capable of applying the negative pressure from another pressure source (not shown) such as a negative pressure pump, instead of the atmospheric air chamber 67. In addition, an electronically controlled electric actuator (not shown) or a hydraulically driven hydraulic actuator (not shown) may be used instead of the diaphragm actuator. Moreover, at least one of the distal end portion of the link member 55 and the distal end portion of the actuating rod 75 may have a bifurcated shape. As an example, the case where at least a part of the wave spring 89 or the like is fitted into the circumferential groove 85 of the connecting pin 79 has been described, but an inner diameter of the pin hole 81 may be increased or a circumferential groove (not shown) into which at least a part of the wave spring 89 or the like is to be fitted may be formed in the inner circumferential surface of the pin hole 81, instead of forming the circumferential groove 85 in the outer circumferential surface of the connecting pin 79. Instead of the use of the spring member such as the annular wave spring 89, another spring member such as a toothed washer having inner and outer teeth or a rubber member made of heat-resistant rubber may be used as the biasing member configured to bias the connecting pin 79 to the center side of the pin hole 81 of the link member 55 or the actuating rod 75. In this case, heat-resistant coating may be applied to the surface of the spring member or the rubber member.

In addition, the scope of the right included in the present disclosure is not limited to the aforementioned embodiment. That is, the variable flow valve mechanism of the present application is not limited to the aforementioned waste gate valve 35 but can also be applied to a switching valve mechanism (not shown) for switching between a supply state and a supply stop state of the exhaust gas with respect to any of a plurality of turbine scroll channels (not shown) formed in the turbine housing (not shown) as illustrated in Japanese Utility Model Laid-Open Publication No. 61-33923 and Japanese Patent Application Laid-Open Publication No. 2001-263078, for example. Furthermore, the variable flow valve mechanism of the present application can also be applied to switching valve mechanism (not shown) for switching between the supply state and the supply stop state of the exhaust gas with respect to any stage of a multiple-stage turbine housing (not shown) as illustrated in Japanese Patent Application Laid-Open Publication Nos. 2010-209688 and 2011-106358, for example.

What is claimed is:
1. A variable flow valve mechanism for a turbocharger, comprising:
a stem;
a mounting member integrally connected to the stem;
a valve provided at a distal end portion of the mounting member, configured to open and close an opening portion of a variable gas flow passage for adjusting a flow rate of an exhaust gas supplied from an engine to a turbine wheel;
a link member integrally connected to the stem;
an actuating rod movably provided in an axial direction of the actuating rod, and rotatably connected to a distal end portion of the link member;
a pin hole formed at one of the actuating rod and the link member;
a connecting pin provided at the other of the actuating rod and the link member, the connection pin disposed in the pin hole and including an outer circumferential surface facing an inner circumferential surface of the pin hole; and a biasing member provided between the inner circumferential surface of the pin hole and the outer circumferential surface of the connecting pin, configured to bias the connecting pin from at least two directions toward a center of the pin hole, wherein the biasing member is an annular wave spring alternately having a plurality of convex portions protruding outward in a radial direction of the connecting pin and a plurality of concave portions dented inward in the radial direction of the connecting pin along a circumferential direction, and the convex portion of the wave spring is brought into pressure contact with the inner circumferential surface of the pin hole, and the concave portion of the wave spring is brought into pressure contact with the outer circumferential surface of the connecting pin.

2. The variable flow valve mechanism according to claim 1, wherein a circumferential groove is formed in the outer circumferential surface of the connecting pin and at least a part of the biasing member is fitted into the circumferential groove of the connecting pin.

3. The variable flow valve mechanism according to claim 2, wherein the biasing member is a torsion spring including a coil portion provided so as to surround the outer circumferential surface of the connecting pin and a pair of arm portions provided so as to protrude, respectively, on both ends of the coil portion, and each of the arm portions of the torsion spring is brought into pressure contact with the inner circumferential surface of the pin hole.

4. A variable flow valve mechanism, for a turbocharger, comprising:
a stem;
a mounting member integrally connected to the stem;
a valve provided at a distal end portion of the mounting member, configured to open and close an opening portion of a variable gas flow passage for adjusting a flow rate of an exhaust gas supplied from an engine to a turbine wheel;
a link member integrally connected to the stem;
an actuating rod movably provided in an axial direction of the actuating rod, and rotatably connected to a distal end portion of the link member;
a pin hole formed at one of the actuating rod and the link member;
a connecting pin provided at the other of the actuating rod and the link member, the connection pin disposed in the pin hole and including an outer circumferential surface facing an inner circumferential surface of the pin hole; and
a biasing member provided between the inner circumferential surface of the pin hole and the outer circumferential surface of the connecting pin, configured to bias the connecting pin from at least two directions toward a center of the pin hole,
wherein the biasing member is a torsion spring including a coil portion provided so as to surround the outer circumferential surface of the connecting pin and a pair of arm portions provided so as to protrude, respectively, on both ends of the coil portion, and each of the arm portions of the torsion spring is brought into pressure contact with the inner circumferential surface of the pin hole.

5. A turbocharger for turbocharging air to be supplied to an engine by using energy of an exhaust gas from the engine, the turbocharger comprising;
a variable gas flow passage configured to adjust a flow rate of the exhaust gas supplied to a turbine wheel; and
a variable flow valve mechanism including:
a stem;
a mounting member integrally connected to the stem;
a valve provided at a distal end portion of the mounting member, configured to open and close an opening portion of the variable gas flow passage;
a link member integrally connected to the stem;
an actuating rod movably provided in an axial direction of the actuating rod, and rotatably connected to a distal end portion of the link member;
a pin hole formed at one of the actuating rod and the link member;
a connecting pin provided at the other of the actuating rod and the link member, the connection pin disposed in the pin hole and including an outer circumferential surface facing an inner circumferential surface of the pin hole; and
a biasing member provided between the inner circumferential surface of the pin hole and the outer circumferential surface of the connecting pin, configured to bias the connecting pin from at least two directions toward a center of the pin hole,
wherein the biasing member is an annular wave spring alternately having a plurality of convex portions protruding outward in a radial direction of the connecting pin and a plurality of concave portions dented inward in the radial direction of the connecting pin along a circumferential direction, and the convex portion of the wave spring is brought into pressure contact with the inner circumferential surface of the pin hole, and the concave portion of the wave spring is brought into pressure contact with the outer circumferential surface of the connecting pin.

6. A turbocharger for turbocharging air to be supplied to an engine by using energy of an exhaust gas from the engine, the turbocharger comprising:
a variable gas flow passage configured to adjust a flow rate of the exhaust gas supplied to a turbine wheel; and
a variable flow valve mechanism including:
a stem;
a mounting member integrally connected to the stem;
a valve provided at a distal end portion of the mounting member, configured to open and close an opening portion of the variable gas flow passage;
a link member integrally connected to the stem;
an actuating rod movably provided in an axial direction of the actuating rod, and rotatably connected to a distal end portion of the link member;
a pin hole formed at one of the actuating rod and the link member;
a connecting pin provided at the other of the actuating rod and the link member, the connection pin disposed in the pin hole and including an outer circumferential surface facing an inner circumferential surface of the pin hole; and
a biasing member provided between the inner circumferential surface of the pin hole and the outer circumferential surface of the connecting pin, configured to bias the connecting pin from at least two directions toward a center of the pin hole, wherein the biasing member is a torsion spring including a coil portion provided so as to surround the outer circumferential surface of the connecting pin and a pair of arm portions provided so as to protrude, respectively, on both ends of the coil portion, and each of the arm portions of the torsion spring is brought into pressure contact with the inner circumferential surface of the pin hole.

* * * * *